(12) United States Patent
Hertel

(10) Patent No.: US 8,552,356 B2
(45) Date of Patent: Oct. 8, 2013

(54) OPTICAL POWER CONVERTER

(75) Inventor: Thomas A. Hertel, Canoga Park, CA (US)

(73) Assignee: Pratt & Whitney Rocketdyne, Inc., Sacramento, CA (US)

(*) Notice: Subject to any disclaimer, the term of this patent is extended or adjusted under 35 U.S.C. 154(b) by 291 days.

(21) Appl. No.: 12/913,841

(22) Filed: Oct. 28, 2010

(65) Prior Publication Data

US 2011/0210236 A1    Sep. 1, 2011

Related U.S. Application Data

(60) Provisional application No. 61/309,386, filed on Mar. 1, 2010.

(51) Int. Cl.
  *H01J 40/14* (2006.01)
  *H01L 31/00* (2006.01)
  *H01L 27/00* (2006.01)

(52) U.S. Cl.
  USPC .............. 250/214 R; 250/214.1; 250/208.1

(58) Field of Classification Search
  USPC .............. 250/205, 552, 553; 315/383, 409; 362/611–613
  See application file for complete search history.

(56) References Cited

U.S. PATENT DOCUMENTS

| | | | |
|---|---|---|---|
| 3,944,908 A | 3/1976 | Oki | |
| 4,263,520 A | 4/1981 | Kajihata et al. | |
| 4,314,327 A | 2/1982 | DePuy | |
| 4,481,675 A | 11/1984 | Ichikawa et al. | |
| 4,625,320 A | 11/1986 | Butcher | |
| 5,036,505 A | 7/1991 | Gleim | |
| 5,160,837 A * | 11/1992 | Hirane et al. | 250/208.2 |
| 5,247,501 A | 9/1993 | Hashimoto et al. | |
| 5,734,293 A | 3/1998 | Gross | |
| 5,805,292 A | 9/1998 | Fournier et al. | |
| 5,880,610 A | 3/1999 | Nishizono et al. | |
| 5,966,237 A | 10/1999 | Sugaya et al. | |
| 5,981,936 A | 11/1999 | Fujiie | |
| 6,072,280 A | 6/2000 | Allen | |
| 6,404,709 B1 | 6/2002 | Kouno | |
| 6,504,799 B1 | 1/2003 | Yamashita et al. | |
| 6,855,919 B2 | 2/2005 | Taguchi | |
| 7,068,933 B2 | 6/2006 | Seong et al. | |
| 7,342,258 B2 * | 3/2008 | Yamazaki et al. | 257/82 |
| 7,415,053 B2 | 8/2008 | Hayashi | |
| 7,619,907 B2 | 11/2009 | Urakabe et al. | |
| 7,636,286 B2 | 12/2009 | Lee et al. | |
| 7,654,681 B2 * | 2/2010 | Kim et al. | 362/97.4 |
| 7,679,353 B2 | 3/2010 | Noda | |
| 7,723,922 B2 | 5/2010 | Lee et al. | |
| 2002/0014849 A1 | 2/2002 | Tsujikawa et al. | |

(Continued)

FOREIGN PATENT DOCUMENTS

| | | |
|---|---|---|
| DE | 30 33 565 A1 | 4/1981 |
| JP | 57061330 | 4/1982 |

(Continued)

*Primary Examiner* — Georgia Y Epps
*Assistant Examiner* — Don Williams
(74) *Attorney, Agent, or Firm* — Carlson, Gaskey & Olds P.C.

(57) ABSTRACT

An optical voltage converter has an emitter array and a receiver array. Each of the emitter array and the receiver array have at least one LED. The LEDs are arranged such that light from the emitter LED directly strikes the receiver LED.

26 Claims, 1 Drawing Sheet

(56) References Cited

U.S. PATENT DOCUMENTS

2005/0061954 A1 3/2005 Itoh et al.
2008/0088550 A1 4/2008 Kim et al.
2010/0051976 A1* 3/2010 Rooymans ............... 257/89

FOREIGN PATENT DOCUMENTS

| JP | 2000251300 | 9/2000 |
| JP | 2001202646 | 7/2001 |
| JP | 2005182117 | 7/2005 |

* cited by examiner

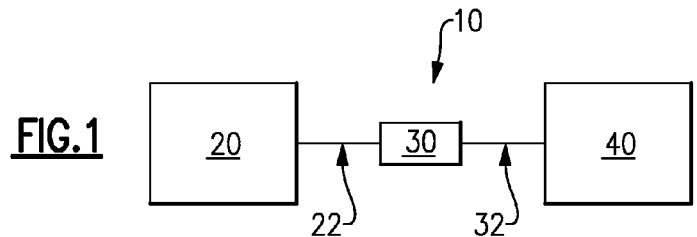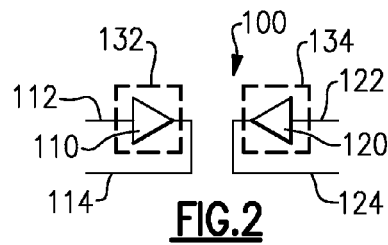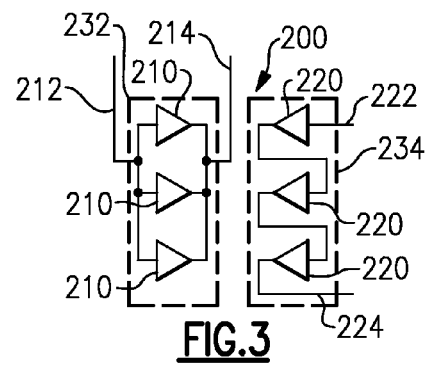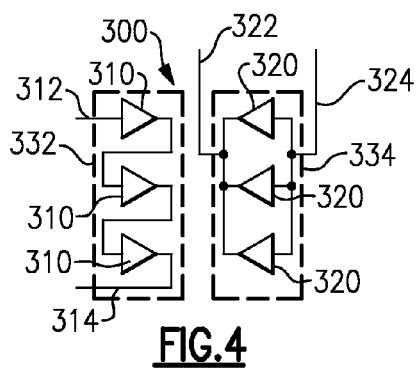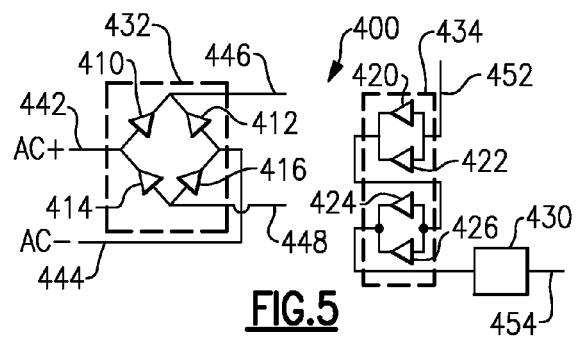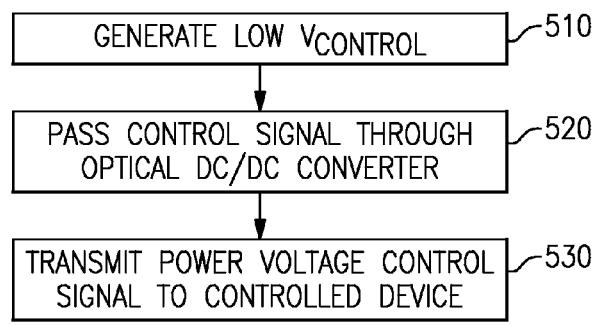

OPTICAL POWER CONVERTER

PRIORITY STATEMENT

The application claims priority to U.S. Provisional Application No. 61/309,386 which was filed on Mar. 1, 2010.

BACKGROUND

The present application is directed to an optically isolating light emitting diode (LED) converter.

Modern electrical systems, such as power systems, are increasingly complex and often require computerized controllers. Computerized controllers operate on low power, and typically use standard computer circuitry to generate output control signals. The devices being controlled, however, may frequently require a higher voltage control signal than standard computer circuits are capable of generating. In order to compensate for the low voltage control signals used in these applications, a converter adjusts the voltage of the output control signal to be within the acceptable range of the controlled devices.

Typical voltage converters are typically magnetic materials wound around an iron core. This type of converter uses known principles of induction and electromagnetism to alter the voltage of the signal passing through the magnetic windings to a level usable by the controlled device.

The magnetic windings and the iron cores of these converters are relatively bulky and heavy, and there are significant costs associated with mass production of the converters. Additionally, magnetic windings and cores generate relatively large amounts of heat and may be inappropriate for heat sensitive applications. Furthermore, the magnetic core converters can provide a backpath which allows voltage spikes or other fluctuations in the controlled device to flow back through the converter to the controller.

BRIEF DESCRIPTION OF THE DRAWINGS

The disclosure can be further understood by reference to the following detailed description when considered in connection with the accompanying drawings wherein:

FIG. 1 schematically illustrates a control circuit for controlling high voltage power electronics with a low voltage controller output.

FIG. 2 schematically illustrates an optical DC/DC converter.

FIG. 3 schematically illustrates an optical DC/DC multiplier converter.

FIG. 4 schematically illustrates an optical DC/DC divider converter.

FIG. 5 schematically illustrates an optical AC/DC converter.

FIG. 6 illustrates a flowchart of a method for converting control signals from a first form to a second form using an optical converter.

DETAILED DESCRIPTION

FIG. 1 schematically illustrates a power control circuit 10. The power control circuit 10 has a controller 20 that outputs a low voltage control signal 22. The low voltage, high current, control signal 22 enters an optical DC/DC converter 30, which outputs a high voltage, low current control signal 32 to a controlled device 40. In an alternate configuration the controller 20 can output a high voltage control signal, and the converter 30 can decrease the voltage control signal to a level required by the controlled device 40. In each of these examples the converter is maintaining the power level of the signal, but converting it from a high voltage, low current, signal to a low voltage, high current, signal or vice-versa. Thus, the power output of the converter is the same as the power input, minus losses for efficiency. The optical DC/DC converter 30 uses light emitting diodes (LEDs) to convert the control signal from a first voltage level to a second voltage level. The LED based optical DC/DC converter additionally provides optical isolation between the controller 20 and the controlled device 40.

FIG. 2 schematically illustrates an example optical DC/DC converter 100. The optical DC/DC converter 100 includes an emitter/receiver unit pair. By way of example, the emitter/receiver pair can be a pair of LEDs 110, 120. A first LED 110 acts as an emitter LED and has a converter input 112 supplying a converter input signal to the LED 110 and a power return 114 providing an electrical return path. Corresponding to the first LED 110, is a second LED 120. The second LED 120 acts as a receiver LED and is connected to a converter output 124 and a power return 122.

When a control signal enters the optical DC/DC converter 100 via the converter input 112, the emitter LED 110 begins to emit light. Each of the LEDs 110, 120 are physically arranged such that when light is emitted from one it directly strikes the other. In the context of optical DC/DC converters light directly strikes a receiver 120 when it travels from the emitter 110 to the receiver 120 without being redirected. This can be achieved by aligning the LEDs with each other in a substrate that allows light to travel from one LED 110, 120 directly to the other LED 110, 120. Alternately, the LEDs 110, 120 can be separated via an air gap that allows the light to be transmitted directly from the emitter LED 110 to the receiver LED 120. During operation, light emitted from the LED 110 strikes the second LED 112, thereby causing a current to be generated within the second LED 120. In this way, the second optical LED 120 is operated as a photoelectric receiver. The current generated in the second LED 120 is the same as the current passing through the first LED 110, minus losses for efficiency. The current generated in the second LED 120 is output at converter output 124, and drawn from the output power return 122.

While the example DC/DC converter of FIG. 2 is illustrated as only a single LED pair and therefore is limited by the maximum voltage of a single LED, it is understood that stacking LED pairs (operating multiple emitter LED 110 and receiver LED 120 pairs in series) allows for a larger input and output voltage to be utilized. Furthermore, the single LED pair configuration is provided for explanatory purposes only.

In order to ensure that a proper emitter LED 110/receiver LED 120 configuration is achieved in the LED pair, the LEDs 110, 120 are constructed such that they have substantially the same light emission frequency. The example of FIG. 1 accomplishes this matching light emission frequency by constructing the LEDs out of the same materials. However, it is understood that differing materials having substantially the same light emission frequency can work equally as well. Furthermore, it is understood that high frequency LEDs can provide optimal receiver/emitter pairs due to their greater efficiencies and higher frequencies. In one example, the emitter/receiver LEDs 110, 120 are matching ultra-violet (UV) frequency LEDs.

Turning now to the example of FIG. 3, a DC/DC multiplier converter 200 is illustrated schematically. An emitter array 232 of the DC/DC multiplier converter 200 includes multiple emitter LEDs 210 connected in parallel such that each of the emitter LEDs 210 has an input voltage equal to the converter input 212. Each of the emitter LEDs 210 are additionally connected to a power return 214. A receiver array 234 of the DC/DC multiplier converter 200 includes the same number of receiver LEDs 220 as there are emitter LEDs 210 in the emitter array 232, with each receiver LED 220 being paired with a corresponding emitter LED 210. Each emitter/receiver LED pair is physically configured relative to its corresponding LED as is described above with regards to FIG. 2. The receiver LEDs 220 are connected in series, with the converter output 224 coming from the last LED 220 in the series, and the power return 222 entering the first LED 220 in the series.

Due to the parallel/series configuration of the emitter LEDS 210 and the receiver LEDS 220, each of the receiver LEDs 220 receives an optical signal equal to the full strength of the control signal input 212. Since the receiver LEDs 220 are connected in series, each of their corresponding outputs are summed, resulting in an output 224 that is a multiple of the input 212. In the illustrated example, there are three emitter LEDs 210 and three receiver LEDs 220, resulting in a converter output 224 that is triple the converter input 212, minus losses due to efficiency. It is understood that different quantities of emitter/receiver pairs could be used resulting in a different multiplier. By way of example, if two emitter/receiver LED pairs are used the converter input 212 is doubled, if four pairs are used the converter input 212 is quadrupled, etc.

FIG. 4 illustrates a DC/DC divider converter 300 that operates in a similar fashion to the DC/DC multiplier converter 200 of FIG. 3 with like numerals indicating like elements. In the illustration of FIG. 4, however, the emitter LEDs 310 in the emitter array 332 are connected to each other in series, and the receiver LEDS 320 in the receiver array 334 are connected to each other in parallel. This results in a reverse of the affect described above with regards to FIG. 3, with the input 312 being divided by the number of emitter/receiver pairs. As described above with FIG. 3, the magnitude of the division corresponds to the number of emitter/receiver pairs. Furthermore, as with the example of FIG. 3, the emitter/receiver pairs are physically arranged relative to each other in a manner similar to the pairs of FIG. 2.

Turning now to an alternate example, FIG. 5 illustrates an AC/DC optical converter 400 which includes minimal inherent gain. The AC/DC optical converter 400 has multiple LEDs 410, 412, 414, 416 arranged in a bridge rectifier according to known bridge rectifier techniques. Each of the LEDs 410, 412, 414, 416 in the bridge rectifier additionally acts as an emitter, and has a corresponding receiver LED 420, 422, 424, 426. The emitter/receiver pairs are physically arranged relative to each other in a manner similar to that described above with regards to FIG. 2. The bridge rectifier has an AC+ input 442, an AC− input 444, a positive power return output 446, and a negative power return 448. The corresponding receiver LEDs 420, 422, 424, 426 are arranged such that the LEDs 420, 422 corresponding to an LED 410, 412 in the upper half of the bridge rectifier are connected in parallel to each other, and the LEDs 424, 426 corresponding to an LED 414, 416 in the lower half of the bridge rectifier are connected to each other in parallel. The groupings of parallel LEDs are then connected in series. The above described topology results in an output that will receive the positive AC voltage and the negative AC voltage from the bridge rectifier across an optical gap and sum the outputs together resulting in a half wave rectified control signal. The half wave rectified control signal is passed through a rectifier filter 430 which smoothes the output to a DC voltage according to known principles, and the AC/DC converter 400 then outputs the DC signal on the converter output 454.

FIG. 6 illustrates a method for converting a signal using an optical DC/DC converter, such as the converters described in FIG. 3, or FIG. 4. The method initially generates a signal using a controller according to known principles in a generate low voltage control signal step 510. The method then passes the control signal through an optical DC/DC converter, such as the example illustrated in FIG. 3, which multiplies the magnitude of the control signal, as well as optically isolating the controller from the controlled device in a pass control signal through optical DC/DC converter step 520. Once the signal has been converted, it is output to the connected device, thereby providing control signals to the device.

The step of passing a low voltage control signal through an optical DC/DC converter can include the sub-steps of passing the low voltage control signal through multiple emitter LEDs, thereby causing the emitter LEDs to emit light and receiving the light at multiple receiver LEDs, thereby causing the receiver LEDs to generate a current. The optical DC/DC converter can be configured according to the above description.

The above method and apparatus are described using an array of receiver LEDs. In an alternate example, the receiver components can be narrow band photo-voltaic cells instead of LEDs with minimal impact on the disclosed system. A narrow band photo voltaic is a photo voltaic cell that only generates power when struck by light within a very small frequency range. In the present application, the frequency of the narrow band photovoltaics is matched to the frequency band of light emitted by the emitter LEDs. Alternately, receiver and emitter units other than LEDs or narrow band photo-voltaic cells that operate similar to LEDs or narrow band photo-voltaic cells could also be used in the above description.

While the above described examples are disclosed using high level schematic topologies, it is understood that this disclosure could be used in any number of DC/DC converter, AC/DC converter, or DC/AC converter applications with minimal modifications. Furthermore, a worker of ordinary skill in this art would recognize that certain modifications come within the scope of the claims. For that reason, the following claims should be studied to determine their true scope and content.

What is claimed is:

1. An optical converter comprising:
   an emitter array having a plurality of emitter units in a first circuit arrangement and operable to emit light in response to a voltage input; and
   a receiver array arranged to receive said light, said receiver array having a plurality of receiver units in a second circuit arrangement distinct from said first circuit arrangement with respect to an electrical interconnection between said receiver units and an electrical interconnection between said emitter units such that said receiver array is operable to generate a voltage output having a voltage level different than a voltage level of said voltage input to said emitter array by greater than efficiency losses, thereby transforming said voltage input into a voltage output of a different voltage level using said optical converter.

2. The optical converter of claim 1, wherein said plurality of receiver units is an array of photovoltaic cells.

3. The optical converter of claim 2, wherein each of said photovoltaic cells in said array of photovoltaic cells is a narrow band photovoltaic cell.

4. The optical converter of claim 3, wherein each said narrow band photovoltaic cell has a frequency band equal to a frequency band of a corresponding one of said plurality of emitter units.

5. The optical converter of claim 1, wherein light from said emitter array travels from said emitter array to said receiver array without being redirected.

6. The optical converter of claim 1, wherein each of said plurality of receiver units is an receiver LED and wherein each of said plurality of emitter units is an emitter LED.

7. The optical converter of claim 6, wherein each of said emitter array and said receiver array have the same number of LEDs.

8. The optical converter of claim 6, wherein each of said plurality of emitter units corresponds to at least one of said plurality of receiver units, wherein each of said plurality of emitter units comprises a light emitter portion, each of said plurality of receiver units comprises a light emitter portion, and wherein each of said light emitter portions of said plurality emitter units faces said light emitter portion of said corresponding one of said plurality of receiver units.

9. The optical converter of claim 6, wherein said plurality of emitter LEDs are arranged in a bridge rectifier arrangement, comprising a plurality positive voltage emitter LEDs and a plurality of negative voltage emitter LEDs, and wherein said plurality of receiver LEDs are arranged in a first grouping of parallel configured receiver LEDs and a second grouping of parallel configured receiver LEDs.

10. The optical converter of claim 9, wherein each receiver LED in said first grouping of parallel configured LEDs corresponds to one of said positive voltage emitter LEDs and each receiver LED in said second grouping of parallel configured LEDs corresponds to one of said negative voltage emitter LEDs.

11. The optical converter of claim 10, wherein said first grouping of parallel configured LEDs and said second grouping of parallel configured LEDs are arranged in series with each other.

12. The optical converter of claim 10, wherein said first grouping of parallel configured LEDs and said second grouping of parallel configured LEDs are arranged in parallel with each other.

13. The optical converter of claim 6, wherein said emitter LEDs and said receiver LEDs comprise a substantially identical light emission wavelength.

14. The optical converter of claim 13, wherein said emitter LEDs and said receiver LEDs comprise substantially the same material composition.

15. The optical converter of claim 13, wherein said emitter LEDs and said receiver LEDs comprise ultra-violet LEDs.

16. The optical converter of claim 1, wherein said emitter array and said receiver array are separated by a gap.

17. The optical converter of claim 16, wherein said gap comprises a solid capable of transmitting light.

18. The optical converter of claim 1, wherein said plurality of emitter array units is an array of emitter LEDs that are connected in an electrically parallel configuration, and said plurality of receiver units is an array of receiver LEDs that are configured in an electrically serial configuration.

19. The optical converter of claim 18, wherein said voltage output, less efficiency, is greater than said voltage input to said emitter array.

20. The optical converter of claim 1, wherein said plurality of emitter array units is an array of emitter LEDs that are connected in an electrically serial configuration, and said plurality of receiver units is an array of receiver LEDs that are configured in an electrically parallel configuration.

21. The optical converter of claim 20, wherein said voltage output, less efficiency losses, is less than said voltage input to said emitter array.

22. A method for controlling power electronics using a low voltage control signal comprising the steps of:
receiving a low voltage control signal from a controller into an optical DC/DC converter;
transforming said low voltage control signal into a power voltage control signal of a different voltage level using said optical DC/DC converter, said transforming including transmitting said low voltage signal from an emitter array of said optical DC/DC converter to a receiver array of said optical DC/DC converter, said emitter array having a plurality of emitter units in a first circuit arrangement and operable to emit light and said receiver array arranged to receive said light, said receiver array having a plurality of receiver units in a second circuit arrangement distinct from said first circuit arrangement with respect to an electrical interconnection between said receiver units and an electrical interconnection between said emitter units; and
transmitting said power voltage control signal to a power electronics device, thereby controlling said power electronics device.

23. The method of claim 22, wherein said step of passing a low voltage control signal through an optical DC/DC converter further comprises the steps of:
passing said low voltage control signal through said plurality of emitter units thereby causing said emitter units to emit light; and
receiving light emitted from said emitter units at said plurality of receiver units thereby causing each of said receiver units to generate a current.

24. The method of claim 23, wherein each of said plurality of emitter units are connected in parallel and each of said receiver units are connected in series, thereby causing said DC/DC converter to have an output voltage that is equal to said input voltage times the number of receiver units, less efficiency.

25. The method of claim 23, wherein each of said emitter units corresponds to a photoelectric receiver unit such that light from said emitter unit directly strikes said photoelectric receiver unit.

26. The method of claim 23, wherein said light emitted from said emitter unit comprises at least an ultra-violet frequency.

* * * * *